United States Patent [19]
MacPherson

[11] Patent Number: 5,354,987
[45] Date of Patent: Oct. 11, 1994

[54] CALIBRATING FOCAL PLANE ARRAYS USING MULTIPLE VARIABLE RADIOMETRIC SOURCES

[75] Inventor: Craig A. MacPherson, Richardson, Tex.

[73] Assignee: Texas Instruments Incorporated, Dallas, Tex.

[21] Appl. No.: 987,039

[22] Filed: Dec. 7, 1992

[51] Int. Cl.$^5$ ............................................. G01D 18/00
[52] U.S. Cl. ................................. 250/252.1; 250/330
[58] Field of Search ......................... 250/252.1 A, 330

[56] References Cited

U.S. PATENT DOCUMENTS

| | | | |
|---|---|---|---|
| 3,612,879 | 10/1971 | Ohman | 250/347 |
| 3,986,384 | 10/1976 | Giorgi | 374/2 |
| 4,387,301 | 6/1983 | Wirick et al. | 250/252.1 |
| 4,965,448 | 10/1990 | Morse et al. | 250/252.1 |

Primary Examiner—Constantine Hannaher
Attorney, Agent, or Firm—René E. Grossman; Richard L. Donaldson

[57] ABSTRACT

A method and system for calibrating focal plane arrays wherein a reference source is periodically disposed between the scene and the detectors so that response measurements can be made at three or more different controlled flux levels. In a first embodiment, a passive infrared reference is used with multiple discrete reflectivity levels. By varying the reflectivity of passive sources during construction, the detectors see some portion of the self-emission of the source and some portion of the detector cryostat temperature. This information is used to obtain accurate calibration. A second embodiment uses continuously varying passive infrared references. Third and fourth embodiments replace the passive discrete and passive continuous infrared sources with active sources. Signal processing is provided to interpolate between the reference measurements.

4 Claims, 1 Drawing Sheet

CALIBRATING FOCAL PLANE ARRAYS USING MULTIPLE VARIABLE RADIOMETRIC SOURCES

BACKGROUND OF THE INVENTION

1. Field of the Invention

This invention relates to a system and method for calibrating the detector elements of a focal plane array (FPA).

2. Brief Description of the Prior Art

Focal plane array imagers include a plurality of detector elements in a matrix formation that image a scene. Every detector element, also referred to as a picture element or pixel, has a slightly different response characteristic. A calibration is performed to normalize the array so that all detector elements in the array respond approximately equally to the same energy source. Many modern systems are self-calibrating as opposed to being calibrated using external test fixtures. These self-calibrating systems use mechanisms, such as active element thermal sources or passive element reflective thermal references (RTR), to provide two flux levels, one "hot" and generally at the high end of the energy range to be sensed and one "cold" and generally at the low end of the energy range to be sensed. In operation, every pixel is illuminated by these two thermal references and the resulting amplitudes are used to estimate the gain and offset correction required to normalize the array on a pixel by pixel basis.

The problem with the prior art systems as described above is that focal plane response typically is non-linear whereas the two flux level system assumes linearity between the flux levels and estimates calibration requirements on the assumption of such linearity. It follows that the results achieved on a pixel by pixel basis have an error whenever the response of the individual pixel is non-linear for differing energy levels impinging thereon or does not perform in accordance with the estimate based upon assumed linearity. It is therefore apparent that a system for providing calibration which is adapted to the non-linear operation of the pixels will provide a more accurate image of a scene as compared with the prior art.

SUMMARY OF THE INVENTION

In accordance with the present invention, the above described limitations of the prior art are minimized and there is provided a system for calibration of each individual pixel of a focal plane array which more closely tracks the actual response of each pixel and compensates for the non-linear response of such pixels.

Briefly, there is provided a thermal reference having either a plurality of flux levels or a continuously varying flux level spaced throughout some region of the expected operating range of the focal plane array. The thermal reference may use either passive or active elements.

Passive elements operate on the principle that the reference itself emits infrared energy based upon its own temperature self-emission. Typical passive references have partially reflective surfaces which allow the detector to see a certain percentage of self-emission energy combined with the reflection of the cold temperature of the detector cryostat. Variable thermal signatures are obtained by varying the percentage of reflectivity at the thermal reference surface during construction.

Active element references operate upon the principle of converting energy (typically electrical) into heat. Active elements may be either hotter or colder than ambient temperature (examples are resistors and thermoelectric coolers, respectively). Typically, variable signatures are obtained by the selection of appropriate active components.

Software or firmware is used to estimate the focal plane array measurement in the case where plural different flux levels are provided. These flux levels include a flux level at or near each extreme of the expected operating range of the system and at least one flux level intermediate the extremes. ICSSCV is such software and is a Fortran subprogram which is part of the International Mathematical Software Library (IMSL). This program calculates a cubic spline curve which smoothes a given set of data points, using statistical considerations, to determine the amount of smoothing required. Reference is made to Craven, Peter and Wahba, Grace, "Smoothing Noisy Data With Spline Functions", Numer. Math. 31, pp. 377-403 (1979) and Merz, P.H., "Spline Smoothing by Generalized Cross-Validation, a Technique for Data Smoothing", Chevron Research Co. Report, October, 1978. The above mentioned program and references are incorporated herein by reference. Estimating could also be performed using other methods, such as smoothing, linear interpolation/extrapolation, neural networks, least squares fit, table lookup, etc., all such types of estimating being well known. In general, the more flux levels used, the better will be the result since estimating would then cover more restricted energy ranges. The results of the calibration are then stored in the same manner as in the prior art to provide the required calibration on a pixel by pixel basis. The result is a focal plane array with more linear response characteristics than were obtainable by use of prior art systems.

The energy reference can take any one of many forms. One type (first embodiment) uses a passive reflective thermal reference (RTR) that contains more than two discrete reflectivity regions. The highest reflectivity region is chosen so that the detector is presented with infrared energy corresponding to the lowest temperature in the operating region. The intermediate and extreme reflectivity regions are chosen to correspond to intermediate and high temperature regions.

The second embodiment is the same as the first except that the RTR has a continuously varying reflectivity profile.

The third embodiment uses more than two discrete active sources to provide reference signatures.

The fourth embodiment uses continuously variable active sources to provide reference signatures.

In all four embodiments, some movement is required to cause the detectors to view the reference sources. This is accomplished either by using servomechanisms to move the reference surfaces in front of the detectors or by using scanners to steer the line-of-sight of the detector to the reference sources.

As a result of the above described improvements, there is provided a focal plane array which displays improved linearity at the output.

DESCRIPTION OF THE PREFERRED EMBODIMENTS

Figure 1:
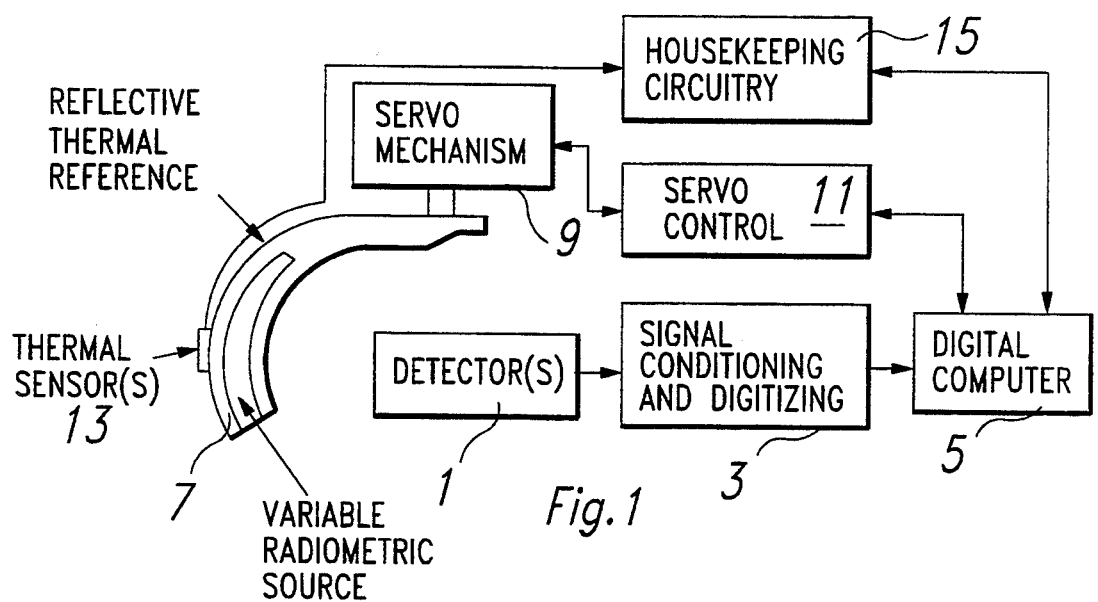
FIG. 1 is a schematic diagram of a system for calibration of a focal plane array in accordance with the present invention.

Referring to FIG. 1, there is shown a schematic diagram of a system for calibration of a focal plane array in accordance with the present invention. The system includes a plurality of detector elements of a focal plane array (which could also be a single detector element or a column or row of detectors) which observe a scene with the infrared energy from the scene impinging upon the detector elements in standard manner. The output from each detector element is transmitted along a line unique to each detector element or multiplexed to signal conditioning and digitizing circuitry 3 of standard type where the signal is buffered, low pass filtered and converted from analog to digital form in standard manner. The conditioned and digitized signal from each detector element is stored in a RAM and then passed to a digital computer 5. The signal from each detector element, on an element-by-element basis, is adjusted in accordance with the calibration data stored in the digital computer on an element-by-element basis in standard manner in accordance with the above mentioned ICSSCV algorithm cited hereinabove.

Periodically, such as between observations or scans of the scene being observed, on a timed basis, or otherwise, a thermal reference is placed in the path of the scene so that the detector elements view only the thermal reference for calibrations as in the prior art. As shown in FIG. 1, the thermal reference 7 is moved into position by the servomechanism 9 which is under control of a servomechanism control 11 which, in turn, is controlled by the digital computer 5. The thermal reference in the prior art is generally a mirror which reflects infrared from a known source, this generally being the energy from a focal plane array which is generally at a temperature approximately 77° K. During this calibrating period, the calibrating output from the detectors 1 is stored in the digital computer 5 to provide the required calibration during actual viewing of the scene under observation. A thermal sensor 13 is provided on the thermal reference 7 to provide an indication of the temperature of the thermal reference, this being fed back to the digital computer 5 through housekeeping circuitry 15 which converts this temperature measurement from analog to digital form to provide information to provide compensation, if required, for the temperature of the thermal reference.

Figure 2:
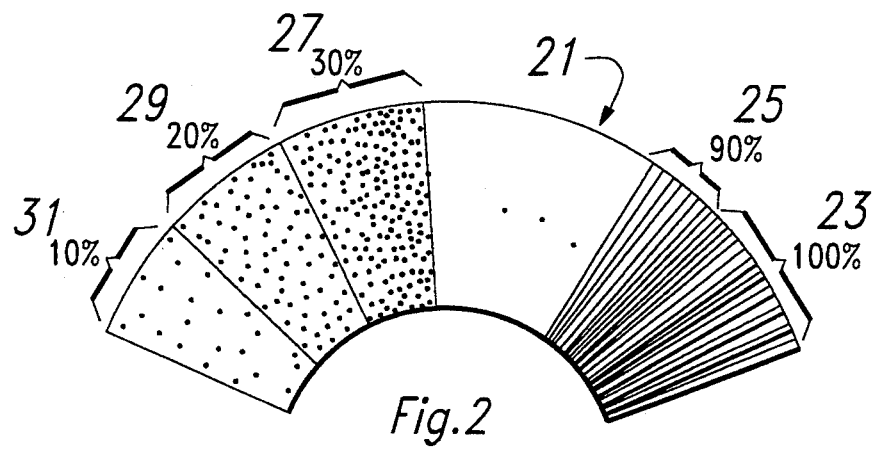
FIG. 2 is a diagram of a discretely variable thermal reference.

With reference to FIG. 2, there is shown a discretely variable thermal reference element 21 which is placed in front of the detector elements 1 so that the infrared light from the thermal reference impinges upon the detector elements. Element 21 includes a plurality of discrete regions 23, 25, 27, 29 and 31, each region progressively emitting more or less infrared energy. Each of the discrete regions 23, 25, 27, 29 and 31 is of sufficient area dimension to flood the detector elements when in proper position. Also, the region 23 is designed to transmit the amount of infrared energy encountered, such as, for example, the energy corresponding to either about the highest or lowest infrared energy level to be encountered and the region 31 is designed to transmit the amount of infrared energy corresponding to either about the lowest or highest infrared energy level to be encountered. The regions 25, 27 and 29 are progressively more or less infrared transmissive in the direction of the extremes of regions 23 and 31.

Accordingly, in operation, a scene will be under observation by the detectors 1 with the signals from the detector elements being conditioned and digitized and then transmitted to the digital computer 5 where the digital signals are then adjusted or calibrated in accordance with the compensating or calibration signals stored in the computer, these calibration signals being based upon the level of the signal being calibrated. After an observation period has ended, the region 31 of element 21 is interjected into the path between the scene under observation and the detectors 1. The detector 1 signal levels are transmitted to the computer 5 for each detector element. This is repeated for each of the regions 29, 27, 25 and 23. Updated calibration signals are then stored for each detector element for calibration of signals corresponding to a scene under observation detected at or between those energy levels. Element 21 is then removed from the light path and the scene is again observed with compensation taking place based upon the updated compensation data in the computer 5.

Figure 3:
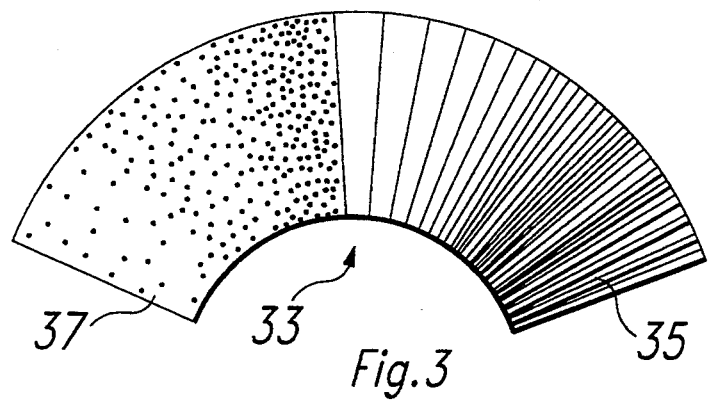
FIG. 3 is a diagram of a continuously variable thermal reference.

With reference to FIG. 3, everything operates as explained with reference to FIG. 2 except that the infrared transmissive element 33 is progressively and continuously less infrared emissive in a direction either from end 35 to end 37 or vice versa. The amount of infrared emission at the ends 35 and 37 will correspond, for example, to the maximum and minimum signals to be received from the scene under observation.

In accordance with a third embodiment of the invention, more than two discrete active elements are used to provide known infrared radiation, one element at each of the extremes and at least one element in a central portion of the temperature range of interest.

In accordance with a fourth embodiment of the invention, a single active element is driven to change temperature or an equivalent thereof in a continuous manner from one extreme of the temperature range of interest to the other extreme. For example, a thermal reference surface is constructed of several equally spaced parallel resistors, the resistance of the resistor at one end being low and the resistance of the resistors monotonically increasing toward the other end, these resistors are all attached to the scene side of a single metal plate such as the variable radiometric source 7. When current is applied to the parallel resistors, the low resistance end will become hottest and the temperature profile will vary smoothly to the high resistance end.

It can be seen that there has been provided a system and method which compensates for non-linear operation of detector elements and provides improved results as compared with the prior art.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

I claim:

1. A system for calibrating the detector elements of a focal plane array comprising:
   (a) at least one detector element for observing a scene emitting indicia of temperatures in a known temperature range; and (b) a reference source having a pair of end portions and a continuous portion with different magnitudes of infrared emission at different locations thereof and continuously less infrared emissive from one of said end portions to the other of said end portions, said reference source successively providing plural magnitudes of reference energy, said magnitudes of reference energy including a magnitude of energy at substantially each of the upper and lower boundaries of said known range and at least one magnitude intermediate said upper and lower boundaries of said known range; and (c) means to periodically cause said magnitudes of energy from said reference source to impinge upon said at least one detector element in place of said scene.

2. The system of claim 1 wherein said reference source is a passive source.

3. The system of claim 2 further including computing means responsive to the output of said at least one detector element when said reference source causes said reference energy to impinge upon said at least one detector element to adjust the output of each of said at least one detector element when said at least one detector element is observing a scene.

4. The system of claim 1 further including computing means responsive to the output of said at least one detector element when said reference source causes said reference energy to impinge upon said at least one detector element to adjust the output of each of said at least one detector element when said at least one detector element is observing a scene.

* * * * *